(12) United States Patent
Leifert

(10) Patent No.: US 7,261,170 B2
(45) Date of Patent: Aug. 28, 2007

(54) MOBILE MACHINE

(75) Inventor: Torsten Leifert, Gögelsen (DE)

(73) Assignee: STILL GmbH, Hamburg (DE)

( * ) Notice: Subject to any disclaimer, the term of this patent is extended or adjusted under 35 U.S.C. 154(b) by 105 days.

(21) Appl. No.: 10/664,406

(22) Filed: Sep. 19, 2003

(65) Prior Publication Data

US 2004/0124020 A1 Jul. 1, 2004

(30) Foreign Application Priority Data

Sep. 26, 2002 (DE) ............................. 102 44 769

(51) Int. Cl.
*B60K 1/00* (2006.01)
(52) U.S. Cl. ..................... 180/65.3; 180/305
(58) Field of Classification Search ............... 180/65.1, 180/65.2, 65.3, 305, 307
See application file for complete search history.

(56) References Cited

U.S. PATENT DOCUMENTS

| | | | | |
|---|---|---|---|---|
| 4,278,298 A | * | 7/1981 | Sauka et al. ................... 303/3 |
| 5,823,280 A | * | 10/1998 | Lateur et al. ............... 180/65.2 |
| 5,935,035 A | * | 8/1999 | Schmidt ........................ 475/5 |
| 6,059,534 A | * | 5/2000 | Kotake et al. ................. 417/15 |
| 6,413,185 B1 | * | 7/2002 | Baginski et al. ............ 475/208 |
| 6,454,033 B1 | * | 9/2002 | Nathan et al. ............. 180/65.1 |
| 6,516,905 B1 | * | 2/2003 | Baumert et al. ........... 180/53.8 |
| 6,589,130 B1 | * | 7/2003 | Baginski et al. ............... 477/3 |
| 6,664,651 B1 | * | 12/2003 | Kotre et al. .................. 290/29 |
| 6,715,572 B2 | * | 4/2004 | Shimabukuro et al. .... 180/65.6 |

* cited by examiner

*Primary Examiner*—Christopher P. Ellis
*Assistant Examiner*—Brian Swenson
(74) *Attorney, Agent, or Firm*—The Webb Law Firm

(57) ABSTRACT

A mobile machine, such as an industrial truck, includes at least two electrical drive systems (4, 5), at least one electrical control system (14) and at least one electrical power source (1). Excess electrical energy generated during deceleration of at least one of the electrical drive systems (4) is fed to at least one other electrical drive system (5).

12 Claims, 3 Drawing Sheets

MOBILE MACHINE

CROSS REFERENCE TO RELATED APPLICATION

This application corresponds to German Application No. 102 44 769.1 filed Sep. 26, 2002, which is herein incorporated by reference in its entirety.

BACKGROUND OF THE INVENTION

1. Field of the Invention

This invention relates to a mobile machine, such as a fork lift truck, with at least two electrical drives, at least one electrical control system, and at least one electric power source.

2. Technical Considerations

During the deceleration of an electrical drive system of a mobile machine, such as a traction drive system of an industrial truck for example, the electrical drive system functions as a generator and converts kinetic energy into electrical energy. If a battery is used as the energy source, this electrical energy can be used to recharge the battery. Because the energy to operate the electrical drive was previously taken from the battery, the charging capacity of the battery is generally sufficient to absorb the energy released during deceleration. However, if a heat engine with a connected generator or a fuel cell system is used as the energy source, for example, the battery is unable to absorb all of the electrical energy generated during deceleration and the generated electrical energy must be discharged in some other way. In addition to the direct conversion of the electrical energy into heat, it is also possible to use the generated energy to charge a conventional electrical buffer storage mechanism, such as a high-capacity capacitor, for example. Although such conventional buffer storage mechanisms are typically large enough to absorb a sufficient amount of the generated energy even during a long downhill run of the mobile machine and, thus, to ensure the braking action, these conventional buffer storage mechanisms are still expensive and take up a lot of space in the mobile machine. If the capacity of the buffer storage mechanism is insufficient to absorb all of the energy generated under all expected operating conditions, an additional braking resistance must be provided, which also takes up space and requires a complex cooling system.

Therefore, it is an object of the invention to provide a mobile machine, such as an industrial truck, with at least two electrical drives and which safely diverts the electrical energy released during deceleration of one of the electrical drives easily and economically.

SUMMARY OF THE INVENTION

The invention teaches that at least a portion of the electrical energy (e.g., the excess electrical energy) generated during the deceleration of at least one of the electrical drive systems is fed to at least one other electrical drive system. It thereby becomes possible to divert the excess energy into a system that is already present in any case, as well as to omit braking resistances or buffer storage mechanisms that would otherwise have to be installed, or to significantly reduce the capacity of such systems.

The electrical drive system to be braked can advantageously be effectively connected with an electrical storage mechanism to absorb the braking energy. During brief decelerations, energy can thereby be absorbed in the electrical storage mechanism and can be available for the electrical drive systems.

The electrical energy storage mechanism is advantageously charged by the electrical drive system that is being braked with only the excess energy, i.e., the amount of energy that is not required by the drive system provided for the absorption of the electrical energy (e.g., second drive system) for its normal operation. Therefore, during a deceleration process, the drive system provided for the absorption of the electrical energy (e.g., second drive system) is supplied only if it actually requires energy.

It is particularly advantageous if the drive system provided for the absorption of the electrical energy (e.g., second drive system), if it is not already in operation, is activated to absorb energy only when the electrical energy storage mechanism is fully charged. The second electrical drive system, if it does not require energy for operation, is thereby put into operation during long-term decelerations and braking operations.

It is particularly advantageous if the drive system provided for the absorption of the electrical energy (e.g., second drive system) is effectively connected with a hydraulic system, such as a hydraulic pump. As a result, the energy absorbed by the second drive system can be transmitted to the hydraulic system.

It is also advantageous if the energy introduced into the hydraulic system from the drive system provided for the absorption of the electrical energy (e.g., second drive system) is converted into thermal energy by means of a pressure reducing valve. Because valves of this type are generally already present in hydraulic circuits, it is thereby possible to dissipate the braking energy easily and effectively.

Energy introduced into the hydraulic system by the drive system provided for the absorption of the electrical energy (e.g., second drive system) can be advantageously converted into thermal energy by means of a hydrodynamic braking device. Even large amounts of energy can thereby be dissipated efficiently and with a low rate of wear.

It is advantageous if at least one fuel cell system is used as the power source for the operation of at least one of the electrical drive systems. These systems are characterized by high efficiency and low emissions.

It is further advantageous if at least one heat engine, such as an internal combustion engine, with a connected generator is used as the power source for the operation of the electrical drive systems. These systems are easy to manufacture and maintain.

BRIEF DESCRIPTION OF THE DRAWINGS

Additional advantages and features of the invention are explained in greater detail below on the basis of the exemplary embodiment illustrated in the accompanying schematic figures, in which like reference numbers identify like parts throughout.

DESCRIPTION OF THE PREFERRED EMBODIMENTS

Figure 1:
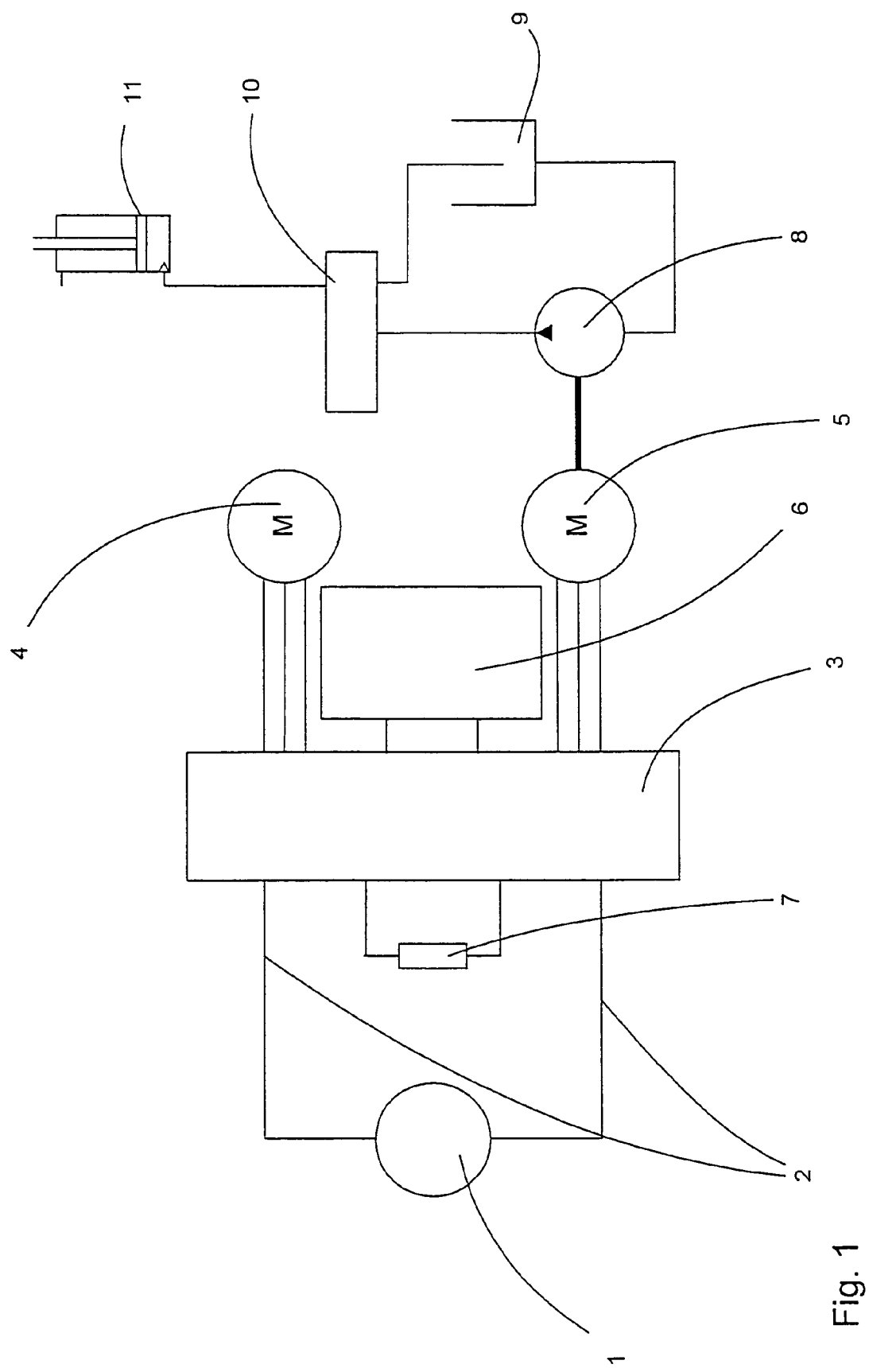
FIG. 1 is a schematic diagram of a known mobile machine.

FIG. 1 shows a schematic diagram of a known mobile machine. From the power source 1, lines 2 run to an electrical control system 3. Connected to the control system 3 are two motors 4, 5 (traction motors) as well as an electrical energy storage mechanism 6 and a braking resistance 7. The motor 4 is used as the traction drive system of the mobile machine. The motor 5 drives a hydraulic pump 8 of a hydraulic circuit. This pump 8 transports the hydraulic fluid from a reservoir 9 to a control valve block 10. The supply to the consumers of hydraulic energy is regulated by means of the control valve block 10. In the illustrated exemplary embodiment, these consumers are represented by a cylinder 11. Hydraulic fluid that is not transported to the consumers is diverted to the reservoir 9 by means of a pressure reducing valve which, in this case, is integrated into the control valve block 10.

If the mobile machine is braked by means of the motor 4, the motor 4 functions as a generator and supplies electricity to the control system 3, which transmits the electricity to the electrical energy storage mechanism 6 or to the braking resistance 7. If the electrical energy storage mechanism 6 is fully charged, the energy can only be reduced by means of the braking resistance 7, which converts it into heat and must, therefore, be provided with sufficient cooling.

Figure 2:
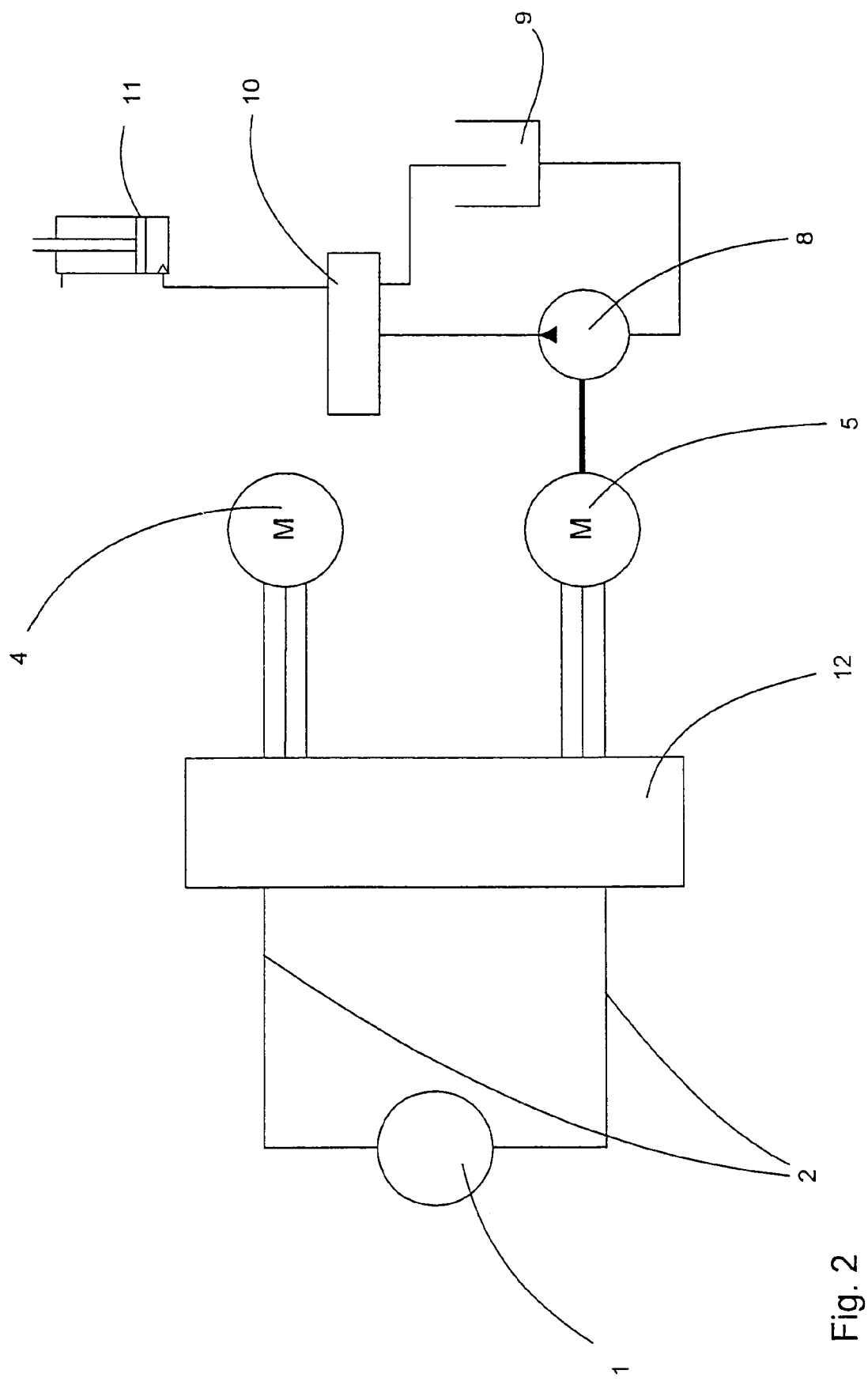
FIG. 2 is a schematic diagram of a mobile machine incorporating features of the invention.

FIG. 2 is a schematic diagram of an exemplary mobile machine incorporating features of the invention. FIG. 2 uses the same numbering system for the components already explained with reference to FIG. 1. New numbers are used for different components that have a similar function, such as the electrical control system 12 of the invention.

The power source 1 supplies the mobile machine, in particular the control system 12, with electrical energy during normal operation. As the power source 1, any conventional power source for known mobile machines can be used to take maximum advantage of their specific characteristics. For example, internal combustion engines are simple and heavy-duty energy sources, while fuel cells have high efficiency and advantageously low emissions. Fuel cells also offer a practically unlimited period of operation when they are supplied via the electric power grid.

The control system 12, as in the illustrated case, can be a one-part component that actuates both motors 4, 5, although there can also be separate control systems for the individual motors 4, 5 which are located spatially separated from each other and can also be effectively connected with each other by means of a third control unit. The motors 4, 5 can be traction motors of the types normally used for mobile machines, for example for operation using direct current, alternating current, or three-phase current. The commands for the actuation of the traction motor 4 can be received by the control system 12 from control elements (not shown here), such as an accelerator pedal or an electronic control system, while the motor 5 can be actuated as a function of the operating conditions, such as the fluid pressure in the hydraulic circuit.

If the mobile machine is braked by means of the motor 4, the motor 4, operating according to the generator principle, supplies electricity to the control system 12 which transmits the electricity to the motor 5. In particular, when fuel cell systems are used as the power source 1, the control system 12 also prevents current from being fed back to the power source 1. The hydraulic pump 8 driven by the motor 5 transports the hydraulic fluid to the control valve block 10.

The control valve block 10 regulates the feed of hydraulic fluid to the hydraulic consumers. In the exemplary embodiment illustrated, these consumers are represented by the cylinder 11 and, on an industrial truck, can be, for example, the lifting and tilting cylinders of a lifting platform or a hydraulic steering actuator. The control valves in the control valve block 10 for the individual consumers can be actuated directly by an operator or also by means of conventional electronic control systems. If the hydraulic pump 8 supplies more hydraulic fluid than is required by the consumers 11, as will frequently be the case even during braking or deceleration, the excess fluid is transported via a pressure reducing valve into the reservoir 9 and the energy is thereby dissipated. The pressure reducing valve in this case can be integrated into the control valve block 10, although it can also be realized in the form of a separate component.

In the exemplary embodiment illustrated, it is therefore possible to do without a storage mechanism for the absorption of electrical energy as well as braking resistances altogether. The space required for the installation of these units can be used for other purposes, and the cost of their maintenance, especially the cooling of braking resistances, can likewise be eliminated altogether, which results in the simplest possible construction of the industrial truck.

Figure 3:
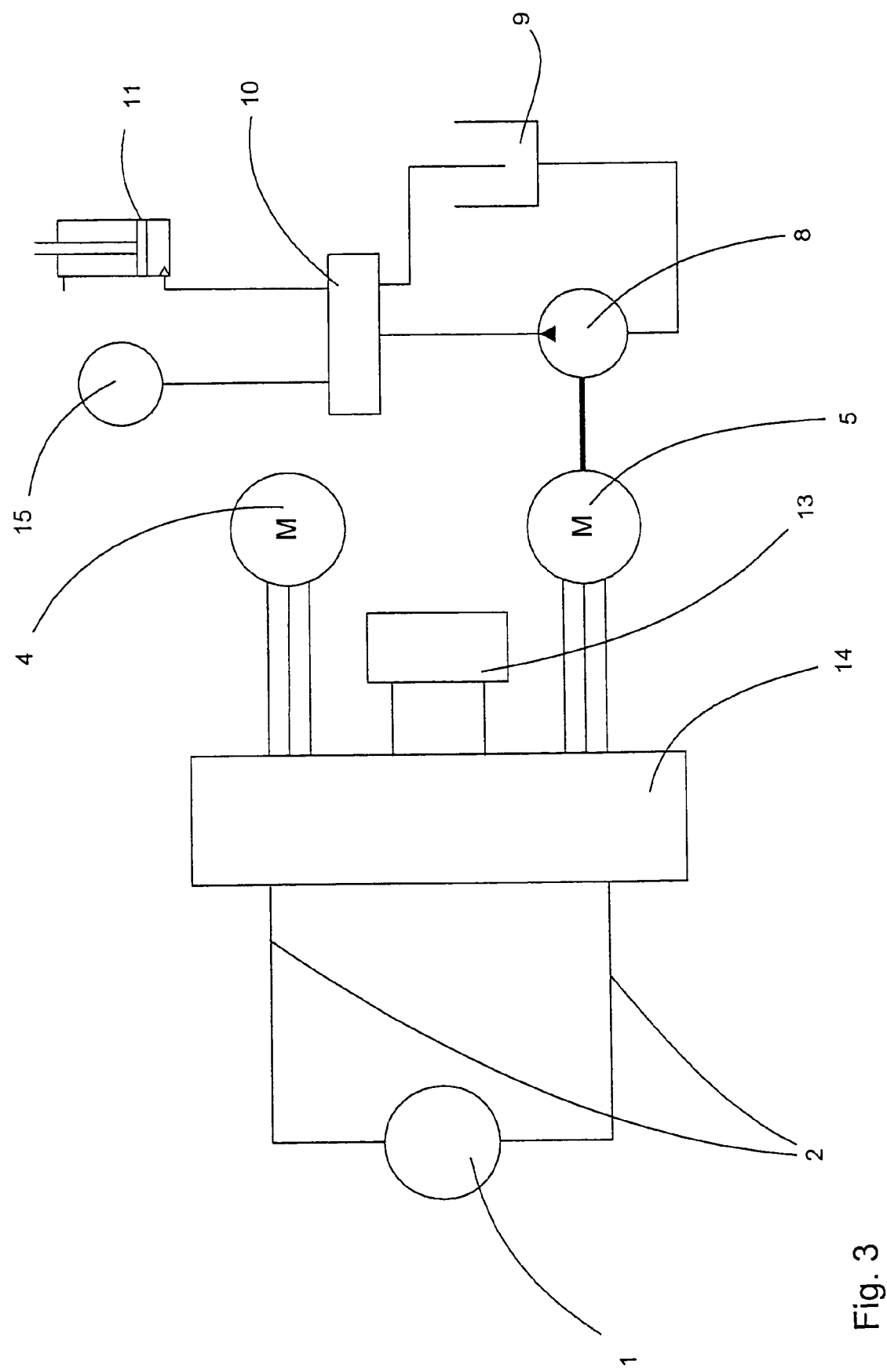
FIG. 3 is a schematic diagram of a mobile machine of the invention with a hydrodynamic brake and an electrical energy storage mechanism.

FIG. 3 shows a circuit diagram for a mobile machine incorporating features of the invention with a hydrodynamic brake and an electrical energy storage mechanism. In addition to the components that are essentially identical to the ones already illustrated in FIG. 2 and identified by the same numbers, FIG. 3 also shows an electrical energy storage mechanism 13, which is electrically connected with the electrical control system 14, as well as a hydrodynamic braking device (retarder) 15.

If the mobile machine is decelerated and the motor 4 supplies electricity to the control system 14, the control system 14 transmits this energy, if and to the extent that the hydraulic consumers do not need any power just then, preferably first to the electrical energy storage mechanism 13. The electrical energy storage mechanism 13 can be one or more large-capacity capacitors, because capacitors can be charged particularly rapidly compared to batteries. As a result of the preferred charging of the electrical energy storage mechanism 13, the electrical energy generated during braking is again available for the motors 4, 5 when a load is applied to them once again, while it is lost when it is transformed into heat for the operation of the mobile machine. The energy consumption of the mobile machine is, therefore, reduced in comparison to an embodiment that does not have an electrical storage mechanism 13 (such as illustrated in FIG. 2). On the other hand, if the motor 5 requires energy during the braking process, for example because the hydraulic cylinder 11 is actuated simultaneously, the energy generated during the braking at the motor 4 is preferably supplied directly to the motor 5.

When the motors 4, 5 require energy again, the energy storage mechanism 13 can also be discharged with priority over the supply of power from the power source 1, so that sufficient capacity in the storage mechanism 13 will be available for the next braking operation. The control of the charging status of the electrical energy storage mechanism 13 is appropriately coordinated to the demand profile of the mobile machine. For example, a minimum charging status of the electrical energy storage mechanism 13 may be desirable during normal operation to meet peak load requirements with the electrical energy storage mechanism 13, thereby making it possible to install a power source 1 with a lower continuous output.

If the electrical energy storage mechanism 13 is no longer able to absorb additional energy, or if the absorption of additional energy is no longer desired for other reasons, the energy can be discharged via the hydraulic circuit. The discharge can be done only via the hydraulic braking device 15, only via the pressure relief valve, or via both simultaneously. The method selected will generally depend on the amount of energy to be dissipated. A discharge of energy via both paths will generally be selected to discharge particularly large amounts of energy, while for moderate amounts of energy, the hydraulic braking device 15 will normally absorb almost all of the energy, and for very small braking outputs, it may be advantageous to route the discharge exclusively via the pressure relief valve.

The exemplary embodiment illustrated here is particularly suited for mobile machines with high power requirements, i.e., for heavy machines or machines that travel at higher speeds, in which the dissipation of all the energy via a pressure relief valve alone cannot be guaranteed, because the hydrodynamic braking device 15 makes it possible to effectively dissipate large amounts of energy with low amounts of wear.

Other conceivable variants include the dissipation of the energy introduced into the hydraulic system solely by means of the hydrodynamic brake. Embodiments with hydrodynamic braking but without electrical energy storage mechanisms are also possible, however, as are embodiments without hydrodynamic braking but with electrical energy storage mechanisms.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A battery operated industrial truck, comprising:
   at least two electrical drive systems, a first electrical drive system used as a traction drive system for driving the industrial truck, and a second electrical drive system used for operating a hydraulic system connected to hydraulic consumers of the industrial truck;
   at least one electrical control system for the first electrical drive system and the second electrical drive system; and
   at least one electrical power source,
   wherein during deceleration of the first electrical drive system, at least a portion of the electrical energy generated by the first electrical drive system being decelerated is supplied to the second electrical drive system through the electrical control system to operate the second electrical drive system rather than being sent to an energy storage mechanism and to dissipate through the hydraulic system when the second electrical drive system no longer requires electrical energy.

2. The industrial truck as claimed in claim 1, further comprising an electrical energy storage mechanism, wherein the first electrical drive system being decelerated is effectively connected with the electrical energy storage mechanism which is configured to absorb at least a portion of the energy generated during braking or deceleration of the first electrical drive system; and
   wherein the electrical control system further includes means for detecting the operation of the second electrical drive system and the operation of the electrical energy storage mechanism and for selectively diverting the energy generated by the first electrical drive system being decelerated to the electrical energy storage mechanism when the second electrical drive system does not require energy for its normal operation, and to the second electrical drive system when the second electrical drive system does require energy for its normal operation.

3. The industrial truck as claimed in claim 2, wherein the electrical energy storage mechanism is charged by the first electrical drive system being decelerated only with the amount of energy that is not required to power normal operation of the second electrical drive system, and wherein the electrical control system further includes means for selectively diverting the energy generated by the first electrical drive system being decelerated from the electrical energy storage mechanism back to the first electrical drive system when the first electrical drive system requires energy.

4. The industrial truck as claimed in claim 2, wherein the second electrical drive system, if it is not already in operation, is activated to absorb energy only when the electrical energy storage mechanism is fully charged.

5. The industrial truck as claimed in claim 1, wherein the second electrical drive system is effectively connected with the hydraulic system by a hydraulic pump.

6. The industrial truck as claimed in claim 5, wherein the hydraulic system includes a pressure reducing valve, and wherein the energy introduced into the hydraulic system by the second electrical drive system is converted into thermal energy by the pressure reducing valve.

7. The industrial truck as claimed in claim 5, wherein the hydraulic system includes a hydrodynamic braking device, and wherein the energy introduced into the hydraulic system by the second electrical drive system is converted into thermal energy by the hydrodynamic braking device.

8. The industrial truck as claimed in claim 1, wherein the electrical power source includes at least one fuel cell system.

9. The industrial truck as claimed in claim 1, wherein the electrical power source includes a heat engine with a connected generator.

10. The industrial truck as claimed in claim 2, wherein the electrical energy storage mechanism is a high-capacity capacitor.

11. The industrial truck as claimed in claim 3, wherein the second electrical drive system, if it is not already in operation, is activated to absorb energy only when the electrical energy storage mechanism is fully charged.

12. The industrial truck as claimed in claim 9, wherein the heat engine is an internal combustion engine.

* * * * *